(12) United States Patent
Norman et al.

(10) Patent No.: US 6,282,231 B1
(45) Date of Patent: Aug. 28, 2001

(54) STRONG SIGNAL CANCELLATION TO ENHANCE PROCESSING OF WEAK SPREAD SPECTRUM SIGNAL

(75) Inventors: Charles P. Norman, Huntington Beach; Charles R. Cahn, Manhattan Beach, both of CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/461,123

(22) Filed: Dec. 14, 1999

(51) Int. Cl.[7] .............................. H04J 13/04; G01S 3/16; G01S 13/00

(52) U.S. Cl. .......................... 375/144; 375/148; 375/349; 370/342; 370/479; 342/378; 342/159; 342/194

(58) Field of Search ...................................... 375/144, 148, 375/285, 349; 370/342, 479; 342/378, 159, 194

(56) References Cited

U.S. PATENT DOCUMENTS

| | | |
|---|---|---|
| D. 314,713 | 2/1991 | Ciranny et al. . |
| D. 314,963 | 2/1991 | Best et al. . |
| D. 343,383 | 1/1994 | Hall et al. . |
| D. 344,942 | 3/1994 | Gilman et al. . |
| D. 346,170 | 4/1994 | Tang . |
| D. 347,436 | 5/1994 | Tang . |
| D. 354,451 | 1/1995 | Burrell et al. . |
| D. 354,452 | 1/1995 | Burrell et al. . |
| D. 361,569 | 8/1995 | Jervis . |
| D. 363,488 | 10/1995 | Shumaker . |
| D. 365,032 | 12/1995 | Laverick et al. . |
| D. 365,292 | 12/1995 | Laverick et al. . |
| 4,203,071 | 5/1980 | Bowles et al. . |
| 4,592,076 | 5/1986 | El-Banna . |
| 4,675,880 | 6/1987 | Davarian . |
| 4,691,348 | 9/1987 | Braathen . |
| 4,701,934 | 10/1987 | Jasper . |
| 4,754,465 | 6/1988 | Trimble . |
| 4,758,959 | 7/1988 | Thoone et al. . |
| 4,796,191 | 1/1989 | Honey et al. . |
| 4,807,256 | 2/1989 | Holmes et al. . |
| 4,847,862 | 7/1989 | Braisted et al. . |
| 4,890,233 | 12/1989 | Ando et al. . |

(List continued on next page.)

FOREIGN PATENT DOCUMENTS

| | | |
|---|---|---|
| 0 436 854 A2 | 7/1991 | (EP) . |
| 0 501 828 A1 | 9/1992 | (EP) . |

(List continued on next page.)

OTHER PUBLICATIONS

"Minimum Probability of Error for Asynchronous Gaussian Multiple–Access Channels," by Sergio Verdu for IEEE Transactions on Information Theory, vol. IT–32, No. 1, Jan. 1986.

(List continued on next page.)

Primary Examiner—Amanda T. Le
(74) Attorney, Agent, or Firm—Fulwider Patton Lee & Utecht, LLP

(57) ABSTRACT

A CDMA coded, spread spectrum radio signal containing a strong signal and a weak signal is received, and the interference of the strong signal with the weak signal is computed to enhance the ability to track the weak signal. The codes modulating both signals are known, and the weak signal can be predicted. The interference of the strong signal is calculated as the product of the amplitude of the strong signal and the predicted crosscorrelation of the strong signal with the weak signal. The strong signal may be measured, predicted, or acquired through a combination of both methods. The crosscorrelation may be predicted for a range of weak signal values, and the weak signal selected as the prediction producing the greatest received power.

17 Claims, 1 Drawing Sheet

U.S. PATENT DOCUMENTS

| | | |
|---|---|---|
| 4,894,662 | 1/1990 | Counselman . |
| 4,910,526 | 3/1990 | Donnangelo et al. . |
| 4,922,212 | 5/1990 | Roberts et al. . |
| 4,928,106 | 5/1990 | Ashjaee et al. . |
| 4,965,586 | 10/1990 | O'Neill et al. . |
| 4,970,523 | 11/1990 | Braisted et al. . |
| 5,043,736 | 8/1991 | Darnell et al. . |
| 5,045,770 | 9/1991 | Brooks . |
| 5,075,694 | 12/1991 | Donnangelo et al. . |
| 5,089,822 | 2/1992 | Abaunza et al. . |
| 5,099,493 | 3/1992 | Zeger et al. . |
| 5,101,416 | 3/1992 | Fenton et al. . |
| 5,107,227 | 4/1992 | Brooks . |
| 5,108,334 | 4/1992 | Eschenbach et al. . |
| 5,109,344 | 4/1992 | Kakihara et al. . |
| 5,111,150 | 5/1992 | Casey . |
| 5,119,101 | 6/1992 | Barnard . |
| 5,134,407 | 7/1992 | Lorenz et al. . |
| 5,144,318 | 9/1992 | Kishi . |
| 5,146,471 | 9/1992 | Cowart . |
| 5,148,179 | 9/1992 | Allison . |
| 5,150,377 | 9/1992 | Vannucci . |
| 5,153,583 | 10/1992 | Murdoch . |
| 5,157,697 | 10/1992 | Anvari et al. . |
| 5,165,109 | 11/1992 | Han et al. . |
| 5,173,715 | 12/1992 | Rodal et al. . |
| 5,175,744 | 12/1992 | Crespo et al. . |
| 5,187,450 | 2/1993 | Wagner et al. . |
| 5,192,957 | 3/1993 | Kennedy . |
| 5,196,743 | 3/1993 | Brooks . |
| 5,202,694 | 4/1993 | Farmer et al. . |
| 5,202,829 | 4/1993 | Geier . |
| 5,210,540 | 5/1993 | Masumoto . |
| 5,219,067 | 6/1993 | Lima et al. . |
| 5,223,844 | 6/1993 | Mansell et al. . |
| 5,225,842 | 7/1993 | Brown et al. . |
| 5,239,669 | 8/1993 | Mason . |
| 5,247,469 | 9/1993 | McCune, Jr. . |
| 5,263,053 | 11/1993 | Wan et al. . |
| 5,265,025 | 11/1993 | Hirata . |
| 5,266,948 | 11/1993 | Matsumoto . |
| 5,268,064 | 12/1993 | Woo et al. . |
| 5,268,695 | 12/1993 | Dentinger et al. . |
| 5,272,485 | 12/1993 | Mason et al. . |
| 5,282,228 | 1/1994 | Scott et al. . |
| 5,293,170 | 3/1994 | Lorenz et al. . |
| 5,296,861 | 3/1994 | Knight . |
| 5,306,971 | 4/1994 | McCune . |
| 5,309,482 | 5/1994 | Wright et al. . |
| 5,311,149 | 5/1994 | Wagner et al. . |
| 5,311,197 | 5/1994 | Sorden et al. . |
| 5,313,069 | 5/1994 | Tham . |
| 5,313,457 | 5/1994 | Hostetter et al. . |
| 5,313,490 | 5/1994 | Schramm et al. . |
| 5,319,374 | 6/1994 | Desai et al. . |
| 5,321,799 | 6/1994 | McCune, Jr. . |
| 5,323,152 | 6/1994 | Morita . |
| 5,323,322 | 6/1994 | Mueller . |
| 5,329,549 | 7/1994 | Kawasaki . |
| 5,334,974 | 8/1994 | Simms et al. . |
| 5,337,243 | 8/1994 | Shibata et al. . |
| 5,345,244 | 9/1994 | Gildea et al. . |
| 5,347,284 | 9/1994 | Volpi et al. . |
| 5,347,536 | 9/1994 | Meehan . |
| 5,347,546 | 9/1994 | Abadi et al. . |
| 5,349,530 | 9/1994 | Odagawa . |
| 5,353,348 | 10/1994 | Sendyk et al. . |
| 5,355,140 | 10/1994 | Slavin et al. . |
| 5,365,192 | 11/1994 | Wagner et al. . |
| 5,365,451 | 11/1994 | Wang et al. . |
| 5,365,516 | 11/1994 | Jandrell . |
| 5,367,463 | 11/1994 | Tsuji . |
| 5,375,059 | 12/1994 | Kyrtsos et al. . |
| 5,383,127 | 1/1995 | Shibata . |
| 5,390,124 | 2/1995 | Kyrtsos . |
| 5,390,207 | 2/1995 | Fenton et al. . |
| 5,402,347 | 3/1995 | McBurney et al. . |
| 5,402,450 | 3/1995 | Lennen . |
| 5,406,491 | 4/1995 | Lima . |
| 5,408,193 | 4/1995 | Rodal . |
| 5,412,660 | 5/1995 | Chen et al. . |
| 5,412,687 | 5/1995 | Sutton et al. . |
| 5,414,729 | 5/1995 | Fenton . |
| 5,416,712 | 5/1995 | Geier et al. . |
| 5,418,537 | 5/1995 | Bird . |
| 5,420,593 | 5/1995 | Niles . |
| 5,422,813 | 6/1995 | Schuchman et al. . |
| 5,422,814 | 6/1995 | Sprague et al. . |
| 5,422,816 | 6/1995 | Sprague et al. . |
| 5,422,917 | 6/1995 | Scott . |
| 5,424,953 | 6/1995 | Masumoto et al. . |
| 5,430,654 | 7/1995 | Kyrtsos et al. . |
| 5,432,803 | 7/1995 | Liu et al. . |
| 5,432,841 | 7/1995 | Rimer . |
| 5,432,859 | 7/1995 | Yang et al. . |
| 5,436,632 | 7/1995 | Sheynblat . |
| 5,448,773 | 9/1995 | McBurney et al. . |
| 5,450,344 | 9/1995 | Woo et al. . |
| 5,450,448 | 9/1995 | Sheynblat . |
| 5,452,211 | 9/1995 | Kyrtsos et al. . |
| 5,465,413 | 11/1995 | Enge et al. . |
| 5,467,095 | 11/1995 | Rodal et al. . |
| 5,469,360 | 11/1995 | Ihara et al. . |
| 5,471,218 | 11/1995 | Talbot et al. . |
| 5,471,518 | 11/1995 | Barber et al. . |
| 5,479,351 | 12/1995 | Woo et al. . |
| 5,485,154 | 1/1996 | Brooks et al. . |
| 5,485,161 | 1/1996 | Vaughn . |
| 5,485,163 | 1/1996 | Singer et al. . |
| 5,486,834 | 1/1996 | Lennen . |
| 5,490,076 | 2/1996 | Rawicz et al. . |
| 5,493,588 | 2/1996 | Lennen . |
| 5,493,694 | 2/1996 | Vlcek et al. . |
| 5,495,257 | 2/1996 | Loomis . |
| 5,495,499 | 2/1996 | Fenton et al. . |
| 5,504,491 | 4/1996 | Chapman . |
| 5,537,121 | 7/1996 | Lennen . |
| 5,537,323 | 7/1996 | Schulte . |
| 5,541,592 | 7/1996 | Shiihara . |
| 5,541,845 | 7/1996 | Klein . |
| 5,552,990 | 9/1996 | Ihara et al. . |
| 5,572,218 | 11/1996 | Cohen et al. . |
| 5,583,513 | 12/1996 | Cohen . |
| 5,604,503 * | 2/1997 | Fowler et al. ..................... 342/378 |
| 5,604,732 | 2/1997 | Kim et al. . |
| 5,610,815 | 3/1997 | Gudat et al. . |
| 5,612,972 | 3/1997 | Fukushi et al. . |
| 5,619,212 | 4/1997 | Counselman, III . |
| 5,640,416 | 6/1997 | Chalmers . |
| 5,675,608 | 10/1997 | Kim et al. . |
| 5,689,252 | 11/1997 | Ayanoglu et al. . |
| 5,724,384 | 3/1998 | Kim et al. . |
| 5,729,571 | 3/1998 | Park et al. . |
| 5,742,922 | 4/1998 | Kim . |
| 5,781,152 | 7/1998 | Renard et al. . |
| 5,790,549 | 8/1998 | Dent . |
| 5,793,818 | 8/1998 | Claydon et al. . |
| 5,799,010 | 8/1998 | Lomp . |
| 5,828,694 | 10/1998 | Schipper . |
| 5,897,605 | 4/1999 | Kohli et al. . |
| 5,898,665 | 4/1999 | Sawahashi et al. . |

| | | |
|---|---|---|
| 5,901,171 | 5/1999 | Kohli et al. |
| 5,901,183 | 5/1999 | Garin. |
| 5,903,654 | 5/1999 | Milton et al. |
| 6,018,704 | 1/2000 | Kohli et al. |

FOREIGN PATENT DOCUMENTS

| | | |
|---|---|---|
| 0 501 829 A1 | 9/1992 | (EP). |
| 0 511 741 A1 | 11/1992 | (EP). |
| 0 635 728 A1 | 1/1995 | (EP). |
| 0 689 034 A1 | 12/1995 | (EP). |
| 2 712 095 | 5/1995 | (FR). |
| WO 95/08779 | 3/1995 | (WO). |

OTHER PUBLICATIONS

"An Adaptive Canceller of Cochannel Interference for Spread–Spectrum Multiple–Access Communication Networks in a Power Line," by Ryuji Kohno, et al. for IEEE Journal on Selected Areas in Communications, vol. 8, No. 4, May 1990.

"Improved Parallel Interference Cancellation for CDMA," by Dariush Divsalar, et al. for IEEE Transactions on Communications, vol. 46, No. 2, Feb. 1998.

* cited by examiner

STRONG SIGNAL CANCELLATION TO ENHANCE PROCESSING OF WEAK SPREAD SPECTRUM SIGNAL

BACKGROUND OF THE INVENTION

1. Field of the Invention

The present invention relates generally to multiple access spread spectrum radio receivers, and more particularly to receivers with enhanced ability to acquire and track a relatively weak signal in the presence of a comparatively stronger signal.

The difference in signal strength often can be attributed to the relative distance of the signal source and the receiver, and thus the difficulty in tracking the weaker signal in the presence of a closer, stronger signal is often referred to as the near-far problem of spread spectrum multiple access. This problem can also occur when one signal source is obscured from the receiver while another signal source has a direct line of site. An example of this would be operating a receiver inside a building, perhaps near a window or a door, thereby receiving some signals at normal signal strength while others are attenuated by the building structure.

2. Description of the Prior Art

The Global Positioning System (GPS) is a radio navigation system operated by the United States Air Force for the dual purpose of providing accurate global positioning information to military as well as civilian users. To this end GPS provides two services: the Precise Positioning Service (PPS) which is available primarily to the US armed forces and requires the use of receivers equipped with the proper PPS equipment, and the Standard Positioning Service (SPS) which is less accurate than PPS but is available to all users whether or not they have access to PPS equipment. The U.S. Department of Defense has the capability to degrade the accuracy of the SPS through what is known as the Selective Availability (S/A) algorithm, and has taken an official position that all such S/A induced errors will be limited to a 100 meter horizontal position error range (2d-RMS). In contrast, PPS is accurate to within 22 meters.

GPS is essentially comprised of at least 24 satellites in orbit around the Earth at an altitude of approximately 20,000 Km in one of six orbits. Each orbit is occupied by at least four satellites. Each GPS satellite broadcasts a unique radio ranging signal that can be received by properly equipped GPS receivers. The signal contains information identifying the particular transmitting satellite and navigation data such as time and satellite position. On a fundamental level, all GPS receivers operate by tracking the ranging signals of multiple GPS satellites and determining the user's position in terms of latitude, longitude, and altitude or another equivalent spatial coordinate system.

The ranging signal broadcast by each satellite is comprised of two signals: the primary Link 1 (L1) signal broadcast at a carrier frequency of 1575.42 MHz and the secondary Link 2 (L2) signal broadcast at a carrier frequency of 1227.6 MHz. Both L1 and L2 carrier signals are spread spectrum signals modulated by digital signals, or codes, that "spread" the spectrum of each carrier signal over a specific bandwidth. The L1 signal is modulated by three bi-phase (i.e. ±1) digital signals: the Clear or Coarse Acquisition (C/A) Code which is a short Pseudo-Random Noise (PRN) code broadcast at a bit (or chip, which refers to each pulse of the noise code) rate of 1.023 MHz (and thus spreads the L1 carrier signal over a 1.023 MHz bandwidth by essentially breaking each bit in the original signal into 1023 separate bits, or chips, in what is known as direct sequence spread spectrum) and which therefore repeats every 1 millisecond; the Precise (P) code which is a much longer PRN code that repeats every week and is broadcast at ten times the chip rate of the C/A code (10.23 MHz); and a 50 Hz navigation data code (D). The C/A code is always broadcast in the clear (or unencrypted) whereas the P code is encrypted by an encrypting (E) code to form what is known as the Y code. The low data rate navigational code D comprises orbital parameters and clock correction information for the satellite modified by S/A.

Currently the SPS is predicated solely upon the L1 signal but in the future the SPS signal will be available on both L1 and L2. The current L1 signal contains an in-phase component modulated by P⊕E⊕D (where ⊕ denotes the logical XOR function) and a quadrature component modulated by C/A⊕D, and can be represented for each satellite i as $$S_{L1i}(t) = \sqrt{2P_{L1i}} \times e_i(t)p_i(t)d_i(t)\cos[\omega_{L1}t + \phi_{L1}] + 2\sqrt{P_{L1i}} \times c_i(t)d_i(t)\sin[\omega_{L1}t + \phi_{L1}]$$

where A represents the signal power, $\omega$ the carrier frequency, and $\phi$ a small phase noise and oscillator drift (i.e. clock error) component.

The broadcast satellite navigation data message D and algorithms to process it are defined in the publicly available U.S. government specification ICD-GPS-200. The satellite position portion of D is actually a prediction that is computed using ranging measurements of the GPS satellites taken at five monitoring stations distributed around the Earth. Periodically, typically daily, the GPS control segment uploads each satellite with its predicted navigation data and an estimated correction to its on-board atomic clock.

The satellite navigation data includes the GPS almanac which is used to predict the position and velocity of each GPS satellites for many weeks into the future. A typical GPS receiver uses the almanac data, the algorithms defined in ICD-GPS-200 and standard linear equation solving techniques to compute the position and velocity of each GPS satellite and to predict the expected range (PRN code phase) and Doppler frequency at which the receiver will find the satellite's signal.

Because all satellites broadcast at the same carrier frequency, each of the satellite ranging signals must be able to share this frequency with a minimum of interference from the other signals. This is accomplished by carefully selecting the PRN codes to have a sharp (1-chip wide) autocorrelation peak to enable code-synchronization and achieve equal spreading over the whole frequency band, and further have low crosscorrelation values, in a method known as Code Division Multiple Access (CDMA). The C/A PRN codes are unique to each satellite and are taken from a family of codes known as Gold codes. The GPS C/A codes are formed as the product (or modulo-2 sum) of two maximal binary code sequences (G1 and G2) each 1023 bits long. The 1023 members of this Gold code family are generated by shifting the starting state of the G2 register with respect to G1. Thirty-two out of the 1023 possible Gold codes were selected for the GPS satellites based upon two criteria: the number of ones and zeros in the code must differ by exactly one (i.e. the codes are balanced), and the crosscorrelation between any two of the C/A codes is no more than 65/1023 or −23.9 dB (normalized to the autocorrelation peak of unity). This crosscorrelation immunity is called the Gold bound, and represents the maximum interference between equal strength C/A code signals with identical frequencies. This PRN signal design enables satisfactory CDMA operation of the GPS system, i.e. as many as 32 satellites sharing the same broadcast band, provided that the received powers of the GPS signals are not larger than the Gold bound, which is typically the case.

The Gold code bound is applicable for signals with identical carrier frequencies. However, due to Doppler frequency shifts caused by motion of the satellites in their orbits and movement of the receiver, the received frequency of the GPS satellite signals is typically shifted by up to ±5 KHz from the nominal 1575.42 MHz L1 carrier frequency. Relative to any single satellite, the frequency of other satellites may differ by as much as ±9 KHz.

The strong/weak crosscorrelation problem is worse if the signals are Doppler shifted. As mentioned previously, the C/A code's Gold code family is generated by forming the mod-2 sum of a selected pair of maximal binary code sequences (G1 and G2) for all 1023 possible time shifts between the two sequences. The crosscorrelation (which is the multiplication of two signals) for binary codes is equivalent to mod-2 addition of the codes because multiplication of ±1 values has a one-to-one correspondence with mod-2 addition of binary 0,1 values. Therefore, the crosscorrelation of two Doppler shifted members of the Gold code family reduces to mod-2 addition of each maximal sequence with itself, followed by another mod-2 addition. The shift-and-add property of a maximal sequence means that the mod-2 sum of a maximal sequence with a shift of the same maximal sequence yields yet another shift of the same maximal sequence. Therefore, crosscorrelation of two Doppler shifted members of the Gold code family yields another member of the same Gold code family. It has been found that these generated Gold codes are not members of the C/A family and may have crosscorrelations that exceed the C/A code design limit.

No closed form analysis of the crosscorrelation interference of Doppler shifted C/A codes with relatively different carrier frequencies is known. Instead, simulations are used to analyze the effects of Doppler shifts on the crosscorrelation of C/A codes. The simulations either generate the two desired frequency offset codes and compute the crosscorrelation directly or generate the Fourier transform of each code, adjusted for frequency offset, and compute the crosscorrelation of the transforms. It has been found that for a ±9 KHz Doppler range the worst case crosscorrelation for the GPS C/A codes is −20.9 dB. This worst case scenario occurs when the relative Doppler shift between the two satellite signals in an integer multiple of 1 KHz.

While Doppler offsets increase the level of strong/weak signal crosscorrelation when the frequency difference is an integer multiple of 1 KHz, frequency attenuation decreases the crosscorrelation effects when the Doppler shift is not a multiple of 1 KHz. The GPS receivers integrate (sum) the in-phase and quadrature (I, Q) measurements for some length of time before they are used for signal detection or signal tracking. If the integrated signal contains a frequency error, then the accumulation decreases the signal's apparent strength by the well known $\sin(x)/x$ function, where x is half the amount of phase rotation in radians that occurs over the integration period (note that the limit of $\sin(x)/x$ is 1 as x approaches 0). Thus, if the Doppler difference between the replica weak signal and the interfering strong signal is 500 Hz and the I, Q integration time is 1 ms, then x is equal to $\pi/2$ radians, $\sin(x)/x$ is equal to $2/\pi$ and the interference is attenuated by approximately 4 dB.

Consequently, a strong/weak signal crosscorrelation problem may occur if the strength of one satellite approaches being 20.9 dB stronger than the strength of the second satellite. Under this condition, the acquisition search may detect the crosscorrelation spectral line from the strong satellite instead of the autocorrelation spectral line from the weak satellite.

The GPS system was designed with the assumption that receivers would be operated out-of-doors with direct lines of sight to all satellites. In this case the C/A code provides adequate protection against strong/weak signal crosscorrelation. However, once a receiver moves indoors or under a canopy of trees, some of the signals can become significantly attenuated while the others continue to be received at normal signal strength. In such circumstances the operational significance of the crosscorrelation peaks of the Gold codes is to cause difficulty in being able to discriminate between a weak GPS signal and the crosscorrelation of a relatively stronger GPS signal. An incorrect discrimination may cause large errors in the latitude, longitude and altitude computed by the GPS receiver.

An SPS-equipped GPS receiver will receive at any given time the L1 ranging signals from as many as twelve satellites, all multiplexed on the same carrier frequency, each modulated by its own C/A PRN Gold code. From this compound carrier signal the receiver must be able to identify and extract the individual satellites' signals and then process each of these signals to recover the information contained therein. Each of these satellites has the potential of interfering with every other satellite signal. In a worst case, when the signals from a single weak satellite and a plurality of strong satellites are received simultaneously, the weak satellite signal may have significant crosscorrelation interference from each strong satellite signal.

When a GPS receiver is first powered on, it has at best only an approximate knowledge of its position, its local oscillator offset (which will appear as a Doppler frequency offset that is common to all satellites) and the correct time. Therefore, the receiver must perform a systematic search through a large portion of all possible C/A code phases and all possible Doppler offsets to locate the satellite signals. During the search the strong/weak crosscorrelation from any relatively strong satellite may cause the receiver to mistake a crosscorrelation spectral line from the strong satellite as a signal from a weak satellite.

After the receiver has started it can predict the C/A code phase and Doppler offset of all the satellites using the almanac data and the algorithms of ICD-GPS-200, at which time it only needs to search a relatively smaller range of C/A code phases and Doppler frequency offsets for the desired satellite signal. Nonetheless, the strong/weak crosscorrelation problem remains when the crosscorrelation peak from a relatively strong satellite occurs within the search range of a relatively weak satellite.

A typical GPS receiver consists of an antenna to receive the carrier signal while rejecting multipath and, optionally, interference signals; a preamplifier comprising a bandpass filter to filter out potential high-level interfering signals in adjacent frequency bands, and a low noise amplifier (LNA) to amplify the carrier signal; a reference oscillator to provide time and frequency reference for the receiver; a frequency synthesizer driven by the oscillator; a downconverter to convert the filtered carrier signal to an intermediate frequency (IF); an IF section to provide further filtering of out-of-band noise and interference, amplification of the signal to a workable signal-processing level, and optionally down conversion of the IF signal to a baseband signal; and an analog to digital converter (ADC) to sample and quantize the signal into in-phase (I) and quadrature (Q) components. The ADC may sample either the IF or the baseband signal, depending upon the receiver design.

The digitized I, Q signal is next fed into one to twelve or more tracking channels. There it is correlated with a C/A PRN code replica that may either be generated internally as needed with shift registers or stored as a complete set of precomputed C/A code chips in memory. The correlation of the replica and received signal is accomplished by mixing (multiplying) the two signals and integrating (summing) the power of the in-phase and quadrature components of the resultant signal. Typically, the phase of the carrier and code of the replica signal are aligned with the received signal by Phase Locked Loops (PLLs), Costas Phase Detection Loops and/or Delay Locked Loops (DLLs). The PLL and Costas loops maintain phase agreement of the received and replica signal by driving the quadrature component to zero while maximizing the in-phase component. The DLL maintains C/A code alignment by balancing the correlation power measured at two or more code offsets such as early and late or early and punctual. Each recovered spread-spectrum L1 signal is then fed to the signal processing portion of the receiver where it is demodulated to recover the signal carrier and the C/A and D codes. These in turn are supplied to a navigation data processor where the position of each satellite being tracked is computed from the D code and various error corrections are performed. Sources of error include ionospheric and tropospheric delays, the Doppler effect, satellite and receiver clock errors, equipment delays, noise, and multipath errors due to a signal being reflected and thus received multiple, but slightly delayed, times.

The maximum $C/N_0$ (signal to noise ratio in a 1 Hz bandwidth) received by GPS receivers near the surface of the Earth is approximately 55 dB-Hz, allowing for additive multipath interference. In contrast, state of the art GPS tracking algorithms can acquire and track GPS signals with $C/N_0$ as low as 24 dB, and future advances promise to lower this threshold even further. Thus, the range of useable GPS signal power is 35 dB or more. Assuming a worst-case strong/weak crosscorrelation C/A code spectral line of −20.9 dB, a method is needed to increase the discrimination of the C/A code by at least 10 dB-Hz.

The prior art has developed a general approach for predicting the crosscorrelation of two Doppler shifted PRN code sequences if the code timings, carrier phases, and signal amplitudes are known. The solution may be summarized as optimum maximum-likelihood demodulation of the unknown data bits by a computationally intensive Viterbi algorithm. In a practical sense, this optimum demodulation can be viewed as equivalent to doing strong signal cancellation with enough delay introduced to estimate the unknown data bits of the strong signals with a low error rate. This general solution assumes an ideal channel, but a practical solution to the near-far problem of CDMA must cope also with multipath propagation effects.

Hence, in light of the above, those skilled in the art have recognized a need to increase the strong/weak signal discrimination within CDMA coded spread spectrum signals. It has also the been recognized by those skilled in the art that it would be of value to develop such a method that will be compatible with the SPS of GPS. The present invention satisfies these needs as well as others.

SUMMARY OF THE INVENTION

What has been needed and heretofore unavailable is a method for removing the effects of a strong code spread signal on a weaker code spread signal, the so called near/far or strong/weak problem of CDMA, which can be implemented in existing systems without exceeding system throughput limitations.

The method of the invention allows for a post correlation removal of strong signal effects on a weaker signal, and can be implemented in almost any multichannel receiver with only a modest addition to the overall throughput loading. The resulting corrected weak signal extends the operation of CDMA receivers into traditionally difficult areas such as in and around buildings or under a forest canopy.

In general, the method consists of tracking one or more strong signals in a multi-channel CDMA receiver such as a GPS receiver. Using information about available signal sources, the receiver may classify any signal sources believed to be present but not currently being tracked as weak signals. These weak signals may be tracked by removing the crosscorrelation effects of all the strong signals on the weak signals. This is done by setting a channel of the multi channel receiver to the predicted frequency and code phase of each weak signal. The measurement from this channel will contain the crosscorrelation of any strong signals with the desired weak signal. The crosscorrelation can be calculated by crosscorrelating the code sequences of the strong and weak signal channels. Because the strong signal is being tracked, its amplitude and phase are known. Finally, as discussed previously, the crosscorrelation has maximum peaks when the relative Doppler between the signals is an integral multiple of 1000 Hz. By scaling each tracked strong signal by the attenuation caused by the difference in frequency between the strong and weak signal and multiplying by the calculated crosscorrelation, the effect of the strong signal on the weak signal can be estimated and thus removed. To allow for both carrier and code tracking of the weak signal with the PLL, DLL and Costas loops, the process must be repeated for at least two reference code offsets such as early and late or early and punctual.

Signal detection of a weak signal can be handled in either of two ways. The simplest method entails only performing signal detection when the delta frequency (difference in actual received frequencies) between the strong and weak signal provides sufficient attenuation of the crosscorrelation of the strong signal with the weak signal. The more complete, but slower and more complicated, method is to search over the appropriate range of Doppler frequencies and possible code offsets, using the method of removing the crosscorrelated strong signal for all possible Doppler and code offsets.

Other features and advantages of the present invention will become apparent from the following detailed description, taken in conjunction with the accompanying drawings, which illustrate, by way of example, the principles of the invention.

DETAILED DESCRIPTION

Figure 1:
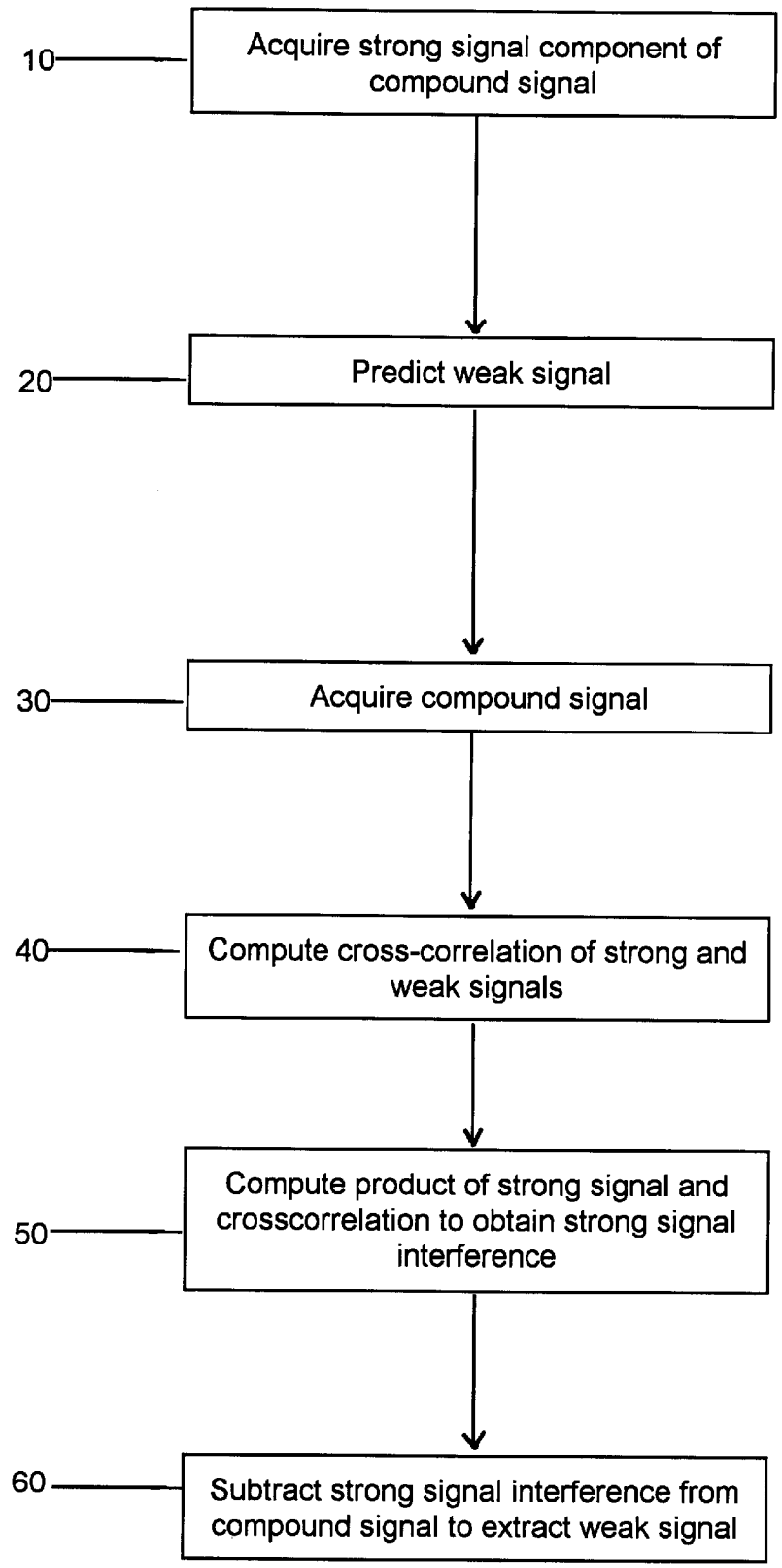
FIG. 1 is a flowchart depicting the main steps of the method of the present invention.

The strong/weak or near/far signal isolation provided by a spread spectrum, PRN code family such as used in CDMA is dependent upon the crosscorrelation between the various code members of the family. In the case of GPS, the isolation of two signals at the same frequency (or multiples of the code repetition rate, in this case 1 KHz) is about 21 to 23 dB. If the relative strengths of two signals differ by more than this limit, the weaker signal cannot be discriminated using only the spreading code. A method of removing the effects of the stronger signal must be applied if the weaker signal is to be tracked.

As noted above, the crosscorrelation effect is at its maximum when the relative Doppler frequency offset between the relatively strong and weak signals is an integer multiple of 1 KHz in the case of C/A GPS signals.

A general solution to the problem of tracking a weak signal spread spectrum signal in the presence of a stronger spread spectrum signal has been developed. It is based on the premise that all aspects of the strong signal's interference can either be measured or calculated in order to remove it from the weaker signal. The solution can be implemented in any multi-channel receiver having the ability to control a channel's frequency and phase as well as selecting the desired spreading code and setting that code's phase position. The receiver typically employs two channels, one to track the weak signal and one to track the interfering strong signal. However, the channel that is used to track the strong signal is not required if the characteristics such as power, code phase and frequency of the strong signal can be obtained or accurately estimated by alternate means.

As shown generally in FIG. 1, the strong signal is first acquired 10, such as by tracking in a first channel of the receiver. The channel provides a measurement of the signal strength of the strong signal along with the phase of the carrier signal and the spreading code. Additional channels may be used to track additional strong signals (not shown in the flowchart).

The code phase of the spreading code of the weaker signal, along with its received frequency and signal phase, are predicted 20 based on data message D by methods known in the art. A second channel in the receiver is dedicated to receiving the compound carrier signal and tracking 30 the predicted weak signal component.

The second receiver channel correlates the incoming signal with the second code at the predicted frequency and signal phase. The resulting in-phase and quadrature (I, Q) measurements contain both the weak signal and the strong signal, each spread by their unique code. Correlation by multiplication of the replica code for the second signal, Code2R, with the incoming signal yields the product Code2R×(weak2×Code2+StrongX×CodeX+ . . . ) where weak2 is the power of weak signal 2, Code2 is the actual code for satellite 2 broadcasting the weak signal 2, StrongX (X=1, 3, 4, . . . ) is the power of strong signal X, and CodeX is the actual code for satellite X contained in the signal. The product Code2R×Code2 is the autocorrelation of the received code 2 and the replica code 2. The autocorrelation function has a value of 1 if the replica code is aligned with the received code. This crosscorrelation of replica code 2 with code X (Code2R×CodeX) is next computed 40 to be removed from the compound signal.

Code1 and Code2 are both members of a PRN code family, and their autocorrelation and crosscorrelation properties are known. It is therefore possible to calculate the crosscorrelation of the two codes at their respective phases by simply multiplying each bit of Code1 by the corresponding (in time) bit of Code 2 to produce their crosscorrelation value. Since there may be a relative Doppler frequency offset between the two codes, the phase of the codes will precess past one another over time and create a new crosscorrelation function. For the GPS system the greatest delta code Doppler typically encountered is about ±9 KHz which is equivalent to 6 code chips per second (1540 carrier cycles per code chip), and thus the maximum recalculation rate of the crosscorrelation value is roughly 6 times per second.

As previously indicated, maximum crosscorrelation occurs at a frequency offset of zero with peaks occurring at intervals of 1000 Hz. There is an attenuation of the crosscorrelation as the frequency offset moves away from zero. This attenuation follows the well known $\sin(x)/x$ curve. If 10 ms measurements are used for tracking or acquisition, the attenuation factor would be equal to $\sin(\Delta freq \times \pi/100 \text{ Hz})/(\Delta freq \times \pi/100 \text{ Hz})$. This produces an attenuation of −10 dB at about a 75 Hz delta frequency. Other local peaks in the $\sin(x)/x$ curve (i.e. locally minimum attenuation) occur at 150 and 250 Hz with attenuations of −13.5 and −18 dB, respectively. This implies that for a desired strong signal suppression of 10 dB, only the first lobe of the $\sin(x)/x$ function need be considered; however, should additional suppression be desired, the entire curve may be considered.

The next step entails computing 50, for each strong signal, the product of the strong signal amplitude and the calculated frequency and time domain (code phase) crosscorrelation. The weak signal is finally extracted by subtracting 60 this product from the compound signal. The weak signal thus extract is subsequently processed in the receiver circuitry as known in the art.

The in-phase and quadrature amplitude (I, Q) of each strong signal is obtained by measurement in each strong signal's own individual receiver channel or by estimation through independent means. Because the strong signal is being actively tracked by the receiver's phase lock loops, the phase of the strong signal is presumed to be near zero radians and thus nearly all the signal power is in the in-phase portion.

A signal comprising a strong signal S1 modulated with a first code Code1 summed with a weak signal w2 modulated with a second code Code2 produces (S1×code1+w2×Code2). The sum of the two signals is correlated with a replica of the second code Code2R to produce $\Sigma\{Code2R \times (S1 \times Code1 + w2 \times Code2)\}$, where the sum $\Sigma$ includes all chips of the PRN code used to modulate the weak signal w2. The auto-correlation of a code with itself is 1 so the preceding equation can be rewritten as $\Sigma\{S1 \times Code1 \times Code2 + w2\}$. We can see that in order to obtain w2 we must remove S1×Code1×Code2. Since we know Code1 and Code 2, we can easily calculate their crosscorrelation. This leaves us to estimate the value of S1 which can be done by independently tracking the strong signal on a separate channel, or by any other convenient means. This computed value of S1×Code1 ×Code2 would be sufficient if the strong signal S1 and the weak signal w2 where at the same frequency. The two signals are received at different frequencies, however, due to the Doppler effect as well as other factors enumerated previously. We know that strength of the crosscorrelation varies with the difference between these frequencies in a $\sin(x)/x$ relationship. We must therefore calculate an attenuation factor based on the difference in frequency between the strong and the weak signal and apply it to the computed crosscorrelation. Furthermore, if more than one strong signal is present, an attenuation factor must be computed for each strong signal.

Computation of the Code Dependent Crosscorrelation Factor

The code dependent portion of the crosscorrelation factor is computed from the known relative states of the PRN code generators to predict the crosscorrelation between a strong signal of unit power and zero frequency offset, and a weak signal. This factor is multiplied by the amplitude of the corresponding strong signal and adjusted for frequency attenuation before it is subtracted from the composite signal.

The various Gold codes used to modulate the PRN signals are all derived from a 2 code sequence G1 and G2 where the bits of the two sequences are combined through an XOR operation after G2 has been offset some number of bits relative to G1 depending on the Gold code selected. As noted elsewhere in the specification, an XOR operation using binary numbers is mathematically equivalent to multiplication of ±1. This allows expressing the equations below in term of products of ±1 while in reality the implementation could be with binary numbers with XORs.

The correlation between two C/A codes can generally be expressed as $$\Sigma Sat1G1(I) \times Sat1G2(I) \times Sat2G1(I\text{-offset}) \times Sat2G2(I\text{-offset}) \times e^{-j\Delta\theta I}$$

where

I=Summation index ranges from 0 to 1022

Sat1G1(I)=Value of satellite 1's G1 coder chip at state I. Possible values are ±1

Sat1G2(I)=Value of satellite 1's G2 coder chip at state I. Possible values are ±1

Sat2G1(I)=Value of satellite 2's G1 coder chip at state I. Possible values are ±1

Sat2G2(I)=Value of satellite 2's G2 coder chip at state I. Possible values are ±1 offset=time difference between the satellite 1 and 2 in units of chips

ΔθxPhase change per chip between satellite 1 and 2 in radians

It should be noted that when the difference I−offset is less than 0, 1023 is added to the difference to maintain the value in the range of 0 to 1022. In other words, the domain of the functions returning coder chip states is limited to the range of 0 to 1022.

The computation time required to compute the 1023 bit-by-bit correlations can be accelerated by making use of standard CPU instructions that perform 8, 16 or 32 bit-wise XORs with a single CPU instruction. The following will demonstrate the method of computing 8 chips in parallel. Those skilled in the art will immediately recognize that the scheme can be easily modified to accommodate some other convenient number of bits per CPU XOR operation.

The 1023 states of G1 and G2 are stored linearly in permanent memory. Thus it is possible to quickly gather 8, 16, 32 or some other convenient number of bits with a single CPU load instruction by computing the address of the desired chip and the shift required to align it. Thirty-two bits is a particularly convenient number because 31 divides 1023 evenly. The preferred embodiment thus reads 32 bits at a time and uses 31 of them at a time for each of 33 intervals that span the 1023 chips of the C/A code. The 31 bit sums are broken into 4 parts of 8, 8, 8, and 7 bits, and each 7 or 8 bit sum is multiplied by $e^{-j\Delta\theta I}$ where I changes by 7.75 chips for each part. The form of the sum is $$\Sigma(e^{-j\Delta\theta I \times 31} \times \Sigma(Sat1G1(I \times 31+J) \times Sat1G2(I \times 31+J) \times Sat2G1(I \times 31+J-\text{offset}) \times Sat2G2(I \times 31 \times J-\text{offset}))$$

$$+e^{-j\Delta\theta(I \times 31+7.75)} \times \Sigma(Sat1G1(I \times 31+J+8) \times Sat1G2(I \times 31+J+8) \times Sat2G1(I \times 31+J+8-\text{offset}) \times Sat2G2(I \times 31+J+8-\text{offset}))$$

$$+e^{-j\Delta\theta(I \times 31+15.5)} \times \Sigma(Sat1G1(I \times 31+J+16) \times Sat1G2(I \times 31+J+16) \times Sat2G1(I \times 31+J+16-\text{offset}) \times Sat2G2(I \times 31+J+16-\text{offset}))$$

$$+e^{-j\Delta\theta(I \times 31+23.25)} \times \Sigma(Sat1G1(I \times 31+J+24) \times Sat1G2(I \times 31+J+24)$$

$$\times Sat2G1(I \times 31+J+24-\text{offset}) \times Sat2G2(I \times 31+J+24-\text{offset})))$$

where

I=Outer index ranges from 0 to 32

J=Inner index ranges from 0 to 7 for the first three sums and from 0 to 6 for the last sum. The inner sums are computed in parallel by using a 32 bit word that contains all 31 bits and using bitwise XOR to perform the multiplications and shifting and adding to sum the 1 bit products.

Note that all of the multiplications of the G1 and G2 codes in the above equation are implemented by bit-wise XOR instructions. The above algorithm is in error by at most −17 dB from an exact computation, and requires about 6000 CPU operations to complete.

Use of Computed Crosscorrelations

Periodically, as needed, the code dependent crosscorrelation factors are computed for all strong and weak signal pairs with small frequency differences, i.e. frequency differences that could cause strong-weak crosscorrelation interference. In the preferred embodiment strong signals are those with $C/N_0>40$ dB and weak signals are those with $C/N_0>30$ dB. Because 10 ms integrations of I, Q measurements are used by the code and phase tracking loops, the maximum "significant" frequency difference (modulo 1000 Hz) is 90 Hz. In the preferred embodiment the code dependent cross correlation factor for each possibly interfering pair of signals is computed for each of the measurements that might potentially be used by the tracking and signal processing algorithms. For example, if early, punctual and late measurements are used by the tracking loops, the correlation factors for each of these code alignments is computed and stored in the tables.

These tables only need be updated at a 10 Hz rate because the maximum Doppler difference is less than 9 KHz or less than 6 chips per second. In addition to maintaining the crosscorrelation table, the frequency attenuation of the crosscorrelation due to the frequency difference is computed at the 10 Hz rate. The attenuation can be expressed as Frequency Attenuation=sin (ΔF mod 1000×Π/100)/(ΔF mod 1000×Π/100)

where

ΔF=Frequency difference between a strong and weak signal in Hz

Mod=modulo offset to give a range of −500 Hz to +500 Hz

The attenuation only needs to be recomputed if the frequency difference changes by more than 5 Hz.

Strong Signal Estimation and Removal

An estimate of the phase and amplitude of the strong signal is required to remove the crosscorrelation. The method used in the preferred embodiment is to track the strong signal on its own dedicated channel and collect the I, Q measurements output over the exact same interval that the weak signal I, Q samples are taken. The known phase and frequency of the replica signal that is used to track the strong signal is an excellent approximation of the actual phase and frequency of the strong signal. Furthermore, because the strong signal is in phase lock, the magnitude of the I measurement provides a good approximation of the amplitude of the strong signal. Finally, the bi-phase modulation of the strong signal data bits D can cause the phase of the strong signal to rotate 180 degrees whenever the data bits transition from 1 to 0 or from 0 to 1. In the preferred embodiment, the phase of the strong signal is corrected by adding 180 degrees to the phase of the replica signal whenever the sign of the I measurement for the strong signal is negative.

Every 10 ms a new set of I, Q correlation data is available from the channel assigned to track the weak signal. The tables of crosscorrelation factors are checked to predict the presence of any interfering strong signals. If strong signals are predicted, the following subtraction is performed to remove the strong signal crosscorrelations FirstCodeOffset=WeakCodeState−StrongCodeState−StrongDoppler×ΔT−TableEntry0CodeState DeltaPhase=WeakCarrierPhase−StrongCarrierPhase−StrongDoppler×ΔT+DeltaKHz×StrongCodeState FirstPhase=FirstCorrelationPhase+DeltaPhase SecondPhase=SecondCorrelationPhase+DeltaPhase FirstMag=FirstCorrelationMag+FirstCodeOffsetFraction×StrongI×FrequencyAttentuation SecondMag=SecondCorrelationMag×(1−FirstCodeOffsetFraction)×StrongI×FrequencyAttenuation CorrectedWeakIQ=WeakIQ−FirstMag×$e^{-jFirstPhase}$−SecondMag×$e^{-jSecondPhase}$ where WeakCodeState=Code state of last output to the weak signals channel StrongCodeState=Code state of last output to the strong signals channel StrongDoppler=Doppler of last output to the strong signals channel ΔT=Difference in time between outputs to the weak and strong channels TableEntry0CodeState=Code state difference of the first element of the crosscorrelation table.

WeakCarrierPhase=Carrier phase angle of last output to the weak signal channel

StrongCarrierPhase=Carrier phase angle of last output to the strong signal channel DeltaKHz=Nearest integer multiple of 1 KHz of the difference between the weak and strong channels Doppler. In units of KHz.

FirstCorrelationPhase=Phase entry in the crosscorrelation table for the chip indicated by FirstCodeOffset SecondCorrelationPhase=Phase entry in the crosscorrelation table for the chip indicated by FirstCodeOffset +1 chip.

FirstCorrelationMag=Magnitude entry in the crosscorrelation table for the chip indicated by FirstCodeOffset.

SecondCorrelationMag=Magnitude entry in the crosscorrelation table for the chip indicated by FirstCodeOffset+1 chip.

FirstCodeOffsetFraction=Fraction of a chip in FirstCodeOffset.

StrongI=Absolute value of I correlation from the strong channel.

FrequencyAttenuation=Attenuation due to frequency offset.

WeakIQ=IQ correlation from the weak signal's channel.

CorrectedWeakIQ=IQ correlation corrected for crosscorrelation from the strong signal. CorrectedWeakIQ is computed for the early, on time, and late correlators by shifting the FirstCodeOffset appropriately, such as by half a chip each. These modified correlations are then used normally in the carrier and code tracking software for the weak signal. The algorithm attenuates the crosscorrelation by at least 10 dB without attenuating the weak signal, and is repeated for each strong signal that may be interfering with the weak signal.

While a particular form of the invention has been illustrated and described, it will be apparent that various modifications can be made without departing from the spirit and scope of the invention. It must be understood that although the preferred embodiment has been described in term of application to GPS receivers, the method of the invention can be applied to any other communication system employing CDMA spread spectrum transmissions that are susceptible to the near-far problem and where the interfering strong signals can be measured or estimated with sufficient accuracy. Accordingly, it is not intended that the invention be limited except as by the appended claims.

What is claimed is:

1. A method of operating a spread spectrum radio signal receiver having at least first and second signal tracking channels to increase the interference discrimination between first and second received signals broadcast on the same carrier frequency band and modulated by first and second codes, respectively, the codes each having a known number of code phases, comprising the steps of:

(a) receiving a first compound signal comprising the first and second received signals;
   (b) operating the first channel to track the first received signal and measure its amplitude, code phase, and received frequency;
   (c) selecting the received frequency and code phase of the second received signal;
   (d) operating the second channel at the selected code phase and received frequency of the second received signal to receive a second compound signal comprising the first and second signals;
   (e) computing the predicted code and frequency domain crosscorrelation of the first received signal with the second received signal;
   (f) multiplying the amplitude of the first received signal with the predicted crosscorrelation to compute the interference between the first and second received signals; and
   (g) subtracting the interference from the second compound signal to extract the second received signal including at least one of its received frequency, amplitude, and code phase.

2. The method of claim 1, comprising the further steps of:
   within step (c), performing the further steps of:
      selecting a range of received frequencies and code phases for the second received signal;
      selecting an initial second code phase and received frequency within the respective selected range; and
      selecting a code phase incremental value and a received frequency incremental value; p1 performing steps (d)–(f) for the initial second code phase and initial received frequency of the second received signal;
   performing step (g) to extract the amplitude of the second received signal;
   repeating steps (d)–(g) for all second code phases and received frequency values within the respective range that are offset from the respective initial values by an integer multiple of the code phase incremental value and received frequency incremental value, respectively; and
   selecting the second received signal code phase and received frequency at which the extracted second received signal has the largest amplitude for tracking in the second channel.

3. The method of claim 2, comprising the further steps of:
   within step (c), performing the further step of:
      selecting a frequency domain crosscorrelation threshold value; within step (e), comparing the frequency domain crosscorrelation with the threshold value; and if the crosscorrelation is greater than the threshold value, proceeding directly to perform step (d) for a different value of the second received signal received frequency.

4. The method of claim 3, wherein the crosscorrelation threshold value is about 10 dB.

5. A method of operating a spread spectrum radio signal receiver having at least first and second signal tracking channels to increase the interference discrimination between first and second received signals broadcast on the same carrier frequency band and modulated by first and second codes, respectively, the codes each having a known number of code phases, comprising the steps of:

(a) receiving a first compound signal comprising the first and second received signals;

(b) operating the first channel to track the first received signal and measure its amplitude;

(c) predicting the first code phase and received frequency of the first received signal;

(d) selecting the second code phase and received frequency of the second received signal;

(e) operating the second channel at the selected code phase and received frequency of the second received signal to receive a second compound signal comprising the first and second received signals;

(f) computing the predicted code and frequency domain crosscorrelation of the first received signal with the second received signal;

(g) multiplying the amplitude of the first received signal with the predicted crosscorrelation to compute the interference between the first and second received signals; and (h) subtracting the interference from the second compound signal to extract the second received signal including at least one of its received frequency, amplitude, and code phase.

6. The method of claim 5, comprising the further steps of:

within step (d), performing the further steps of:
  selecting a range of received frequencies and code phases for the second received signal;
  selecting an initial second code phase and received frequency within the respective selected range; and
  selecting a code phase incremental value and a received frequency incremental value;

performing steps (e)–(g) for the initial code phase and initial received frequency of the second received signal;

performing step (h) to extract the amplitude of the second received signal; repeating steps (e)–(h) for all second code phases and received frequency values within the respective range that are offset from the respective initial values by an integer multiple of the code phase incremental value and received frequency incremental value, respectively; and selecting the second received signal code phase and received frequency at which the extracted second received signal has the largest amplitude for tracking in the second channel.

7. The method of claim 6, comprising the further steps of:

within step (d), performing the further step of:
  selecting a frequency domain crosscorrelation threshold value; within step (f), comparing the frequency domain crosscorrelation with the threshold value; and if the crosscorrelation is greater than the threshold value, proceeding directly to perform step (e) for a different value of the second received signal received frequency.

8. The method of claim 7, wherein the crosscorrelation threshold value is about 10 dB.

9. A method of operating a spread spectrum radio signal receiver having at least one signal tracking channel to increase the interference discrimination between first and second received signals broadcast on the same carrier frequency band and modulated by first and second codes, respectively, the codes each having a known number of code phases, comprising the steps of:

(a) acquiring the amplitude, code phase, and received frequency of the first received signal;

(b) selecting the received frequency and code phase of the second received signal;

(c) operating the tracking channel at the selected code phase and received frequency of the second received signal to receive a compound signal comprising the first and second received signals;

(d) computing the predicted code and frequency domain crosscorrelation of the first signal with the second received signal;

(e) multiplying the amplitude of the first signal with the predicted crosscorrelation to compute the interference between the first signal and the second received signal; and (f) subtracting the interference from the compound signal to extract the second received signal including its code phase, received frequency, and amplitude.

10. The method of claim 9, wherein the receiver includes an additional signal tracking channel, and comprising within step (a) the further steps of:

receiving in the additional channel an additional compound signal comprising the first received signal; and operating the additional channel to track the first received signal and measure its amplitude, code phase, and received frequency.

11. The method of claim 10, comprising the further steps of:

within step (b), performing the further steps of:
  selecting a range of received frequencies and code phases for the second received signal;
  selecting an initial second code phase and received frequency within the respective selected range; and
  selecting a code phase incremental value and a received frequency incremental value;

performing steps (c)–(e) for the initial code phase and initial received frequency of the second received signal;

performing step (f) to extract the amplitude of the second received signal;

repeating steps (c)–(f) for all second code phases and received frequency values within the respective range that are offset from the respective initial values by an integer multiple of the code phase incremental value and received frequency incremental value, respectively; and selecting the second received signal code phase and received frequency at which the extracted second received signal has the largest amplitude for tracking in the second channel.

12. The method of claim 11, comprising the further steps of:

within step (b), performing the further step of:
  selecting a frequency domain crosscorrelation threshold value; within step (d), comparing the frequency domain crosscorrelation with the threshold value; and if the crosscorrelation is greater than the threshold value, proceeding directly to perform step (c) for a different value of the second received signal received frequency.

13. The method of claim 12, wherein the crosscorrelation threshold value is about 10 dB.

14. The method of claim 9, wherein the receiver includes an additional signal tracking channel, and comprising within step (a) the further steps of:
   receiving in the additional channel an additional compound signal comprising the first received signal;
   operating the additional channel to track the first received signal and measure its amplitude; and
   predicting the code phase and received frequency of the first received signal.

15. The method of claim 14, comprising the further steps of:
   within step (b), performing the further steps of:
      selecting a range of received frequencies and code phases for the second received signal;
      selecting an initial second code phase and received frequency within the respective selected range; and
      selecting a code phase incremental value and a received frequency incremental value;
   performing steps (c)–(e) for the initial code phase and initial received frequency of the second received signal;
   performing step (f) to extract the amplitude of the second received signal;
   repeating steps (c)–(f) for all second code phases and received frequency values within the respective range that are offset from the respective initial values by an integer multiple of the code phase incremental value and received frequency incremental value, respectively; and
   selecting the second received signal code phase and received frequency at which the extracted second received signal has the largest amplitude for tracking in the second channel.

16. The method of claim 15, comprising the further steps of:
   within step (b), performing the further step of:
      selecting a frequency domain crosscorrelation threshold value; within step (d), comparing the frequency domain crosscorrelation with the threshold value; and
   if the crosscorrelation is greater than the threshold value, proceeding directly to perform step (c) for a different value of the second received signal received frequency.

17. The method of claim 16, wherein the crosscorrelation threshold value is about 10 dB.

* * * * *

UNITED STATES PATENT AND TRADEMARK OFFICE
CERTIFICATE OF CORRECTION

| | | |
|---|---|---|
| PATENT NO. | : 6,282,231 B1 | Page 1 of 1 |
| DATED | : August 28, 2001 | |
| INVENTOR(S) | : Charles P. Norman et al. | |

It is certified that error appears in the above-identified patent and that said Letters Patent is hereby corrected as shown below:

<u>Column 9,</u>
Line 26, before "Phase", replace "X", with -- = --.

Signed and Sealed this

Ninth Day of April, 2002

Attest:

*Attesting Officer*

JAMES E. ROGAN
*Director of the United States Patent and Trademark Office*